(12) United States Patent
Wetzig et al.

(10) Patent No.: US 10,852,212 B2
(45) Date of Patent: Dec. 1, 2020

(54) LEAK DETECTION ON A FLEXIBLE TEST PIECE IN A FILM CHAMBER

(71) Applicant: INFICON GmbH, Cologne (DE)

(72) Inventors: Daniel Wetzig, Cologne (DE); Silvio Decker, Cologne (DE); Jochen Puchalla-König, Cologne (DE)

(73) Assignee: INFICON GmbH, Cologne (DE)

( * ) Notice: Subject to any disclaimer, the term of this patent is extended or adjusted under 35 U.S.C. 154(b) by 200 days.

(21) Appl. No.: 16/072,308

(22) PCT Filed: Jan. 30, 2017

(86) PCT No.: PCT/EP2017/051883
§ 371 (c)(1),
(2) Date: Jul. 24, 2018

(87) PCT Pub. No.: WO2017/129809
PCT Pub. Date: Aug. 3, 2017

(65) Prior Publication Data
US 2019/0033163 A1     Jan. 31, 2019

(30) Foreign Application Priority Data

Jan. 29, 2016 (DE) .................. 10 2016 201 359

(51) Int. Cl.
*G01M 3/32* (2006.01)
*G01M 3/36* (2006.01)
*G01M 3/38* (2006.01)

(52) U.S. Cl.
CPC .......... *G01M 3/3218* (2013.01); *G01M 3/363* (2013.01); *G01M 3/38* (2013.01)

(58) Field of Classification Search
CPC ....... G01M 3/3218; G01M 3/363; G01M 3/38
See application file for complete search history.

(56) References Cited

U.S. PATENT DOCUMENTS 6,732,571 B1 *  5/2004  Flosbach ................. G01M 3/20
                                                      340/605
6,955,076 B1   10/2005  Widt et al.
7,665,346 B1 *  2/2010  Stauffer .............. G01M 3/3281
                                                       73/49.3
(Continued)

FOREIGN PATENT DOCUMENTS

DE    102012200063 A1   7/2013
EP        1333267 A1    8/2003
(Continued)

*Primary Examiner* — Herbert K Roberts
*Assistant Examiner* — John M Royston
(74) *Attorney, Agent, or Firm* — The Webb Law Firm

(57) ABSTRACT

The invention relates to a method for leakage detection on at least one flexible test piece in a film chamber, including inserting the at least one test piece into a film chamber, lowering the pressure in the film chamber outside the at least one test piece, and detecting a leakage in the at least one test piece by observing the spatial change of the film of the film chamber. The outer contour of the at least one test piece is transferred to at least one section of the film by the lowering of the pressure in the film chamber. The contour of the film is recorded with an image recording system, and the recorded images of the contour are compared with reference images of said contour in the event of a tight test piece.

6 Claims, 1 Drawing Sheet

(56) References Cited

U.S. PATENT DOCUMENTS

2008/0127716 A1* 6/2008 Eliasson ............... G01M 3/363
                                                          73/45.4
2010/0170326 A1  7/2010  Miller et al.
2012/0307044 A1  12/2012 Barker
2013/0141571 A1  6/2013  Yasooka et al.
2014/0326051 A1  11/2014 Wetzig et al.

FOREIGN PATENT DOCUMENTS

EP     2584334 A1    4/2013
WO  2011098788 A1    8/2011

* cited by examiner

LEAK DETECTION ON A FLEXIBLE TEST PIECE IN A FILM CHAMBER

CROSS-REFERENCE TO RELATED APPLICATIONS

This application is the United States national phase of International Application No. PCT/EP2017/051883 filed Jan. 30, 2017, and claims priority to German Patent Application No. 10 2016 201 359.9 filed Jan. 29, 2016, the disclosures of which are hereby incorporated in their entirety by reference.

BACKGROUND OF THE INVENTION

Field of the Invention

The invention relates to a method for leak detection on a flexible, non-rigid test piece.

Description of Related Art

Non-rigid test pieces have a flexible structure yielding with pressure change. Such test pieces are, e.g., food packages. When the differential pressures between the inner pressure of the test piece and the ambient pressure thereof is too large, there is a risk that the test piece bursts or is damaged at least.

Conventionally non-rigid test pieces are filled with a test gas and the test gas is measured in the exhaust gas flow of the pump system used to create the necessary differential pressures. As an alternative, the use of a specific test gas may be omitted, if the sensor is adapted to the filler gas inside the test piece. In this measuring method, influences by the ambient gas may compromise the measuring result.

U.S. Pat. No. 6,955,076 describes the detection of a leak in a test piece in a film chamber with the use of a test gas. It is described to improve the closability and the tightness of the film chamber by evacuating a volume in the edge zone of the film chamber, the volume being independent of the test chamber. Thereby, it is achieved that no gas from the environment of the film chamber gets into the test chamber volume through leaks in the closure region of the chamber and compromises the measuring result.

DE 10 2012 200 063 A1 describes a method for leak detection on a non-rigid test piece contained in a film chamber. After the test piece has been positioned in the film chamber, the pressure in the film chamber is reduced in the region outside the test piece. A leak in the test piece is detected based on a spatial change of the film of the film chamber. Here, the change in film position or a change in the volume of the film chamber is measured. This method offers the advantage that the tightness of the film chamber has only a negligible influence on the measuring result. It is merely necessary to achieve a tightness of the film chamber that allows the reduction of the pressure inside the film chamber. The measuring of the positional change may be performed by a laser-optical measuring of the position of the film surface, by measuring the change in capacitance of a metalized film surface, or by measuring a contact with the film surface. The subject matter of DE 10 2012 200 063 A1 is incorporated into the present application by reference.

When measuring the positional change of the film it is not possible, in particular with a plurality of test pieces contained in the film chamber at the same time, to determine which of the test pieces is leaking. The measuring accuracy depends on the variance of the volume from test piece to test piece.

SUMMARY OF THE INVENTION

It is an object of the invention to provide an improved method for leak detection on a flexible test piece in a film chamber.

The method of the present invention is described below.

According to the invention the pressure in the film chamber is reduced outside the test piece such that at least a portion of the film clings to the outer contour of the test piece contained in the film chamber or the test pieces contained in the film chamber. The outer contour of the test piece or the test pieces is thus transferred to the film. This contour of the film is sensed using an imaging system. The images of the film contour captured are compared to previously captured stored reference images captured for a tight test piece with otherwise identical marginal conditions of the measuring arrangement. The image captured by the imaging system is thus subjected to a variance comparison to detect leaking test pieces. In particular, with a plurality of test pieces in the film chamber, it is possible to detect which test piece is leaking. This is possible because the contour only changes in the region of the leaking test piece, whereas with tight test pieces no change occurs or the extent of change is at least not the same.

The contour of the film surface may be sensed in different ways. Advantageously, the film surface is provided with a grid which is formed e.g. by dots arranged in a raster (grid structure) or by intersecting lines. In the case of dots, these are arranged at the intersections of an imaginary grid.

The grid may be projected on the film surface, e.g. by means of a laser or another optical system which images the grid on the film surface using light. Preferably, grid lines are projected on the film surface by means of a laser.

As an alternative, the grid is fixedly applied on the film surface, e.g. by printing, embossing, painting etc.

Using a known image processing and image recognition system, the images captured are analyzed and evaluated. The contours and grids of the respective images captured are compared to the corresponding contours and grids of the previously captured reference images.

Here, the temporal course of the contour change is a measure of the leakage rate used to determine the leakage rate of a detected leak. In particular, in case of a gross leak, a test piece pumped empty can be detected based on the changed contour. When a plurality of test pieces is tested at the same time, a detected leakage can be attributed to one of the test pieces.

BRIEF DESCRIPTION OF THE DRAWINGS

An embodiment of the invention will be explained in more detail hereunder with reference to the Figures. In the Figures.

DESCRIPTION OF THE INVENTION

Figure 1:
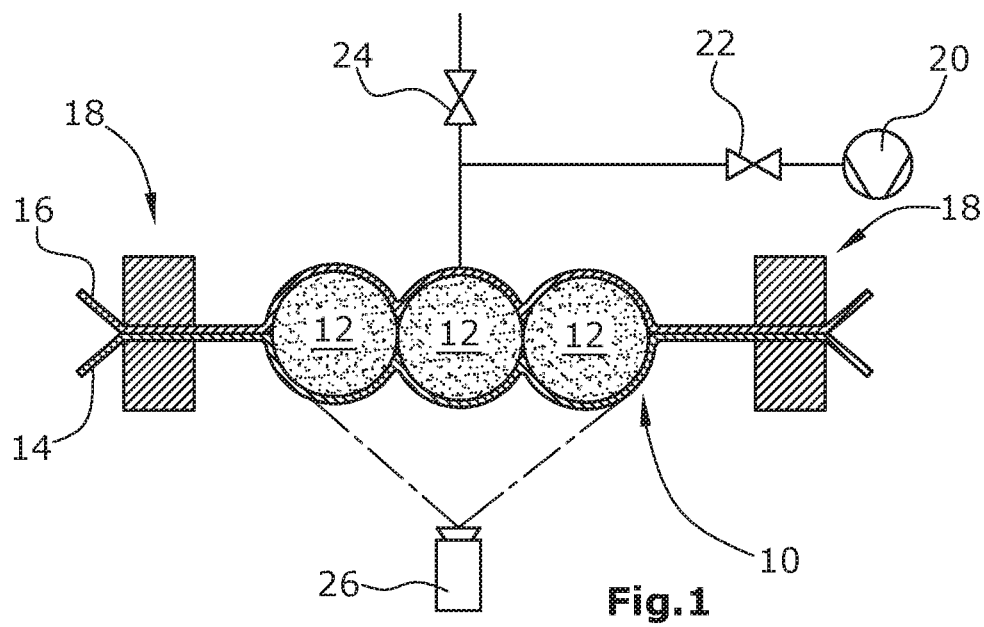
FIG. 1 shows a measuring arrangement for the application of the method according to the invention.

With reference to FIG. 1, the measuring arrangement consists of a film chamber 10, into which a plurality of flexible, i.e. non-rigid test pieces 12 in the form of food packages have been placed. After having placed the test pieces 12 into the film chamber 10, the same is closed by laying the two films 14, 16 forming the film chamber onto each other with the test pieces 12 therebetween and pressing the films 14, 16 against each other in an air-tight manner at the edge zones by means of a clamping device 18.

Thereafter, the film chamber is evacuated by means of a vacuum pump 20 connected with the interior of the film chamber via a valve 22. Here, the valve 22 is opened and a vent valve 24 that is also connected with the interior of the film chamber 10 is closed to atmosphere. While atmospheric pressure still prevails in the test pieces 12, the pressure in the volume surrounding the test pieces 12 is lowered inside the film chamber 10 by at least 100 mbar with respect to the ambient pressure of the film chamber 10. After the pressure in the film chamber has been lowered, the valve 22 is also closed and the pump 20 is deactivated.

Using a laser system not illustrated in the Figures, a grid 28 of intersecting lines is projected on the surface of the film 14. Using the optical camera of an imaging system 26, the surface of the film 14 provided with the grid 28 is filmed. The pressure inside the film chamber 10 in the region outside the test pieces 12 is lowered such that the films 14, 16 cling to the outer contour of the test pieces 12. The outer contour 12 is impressed into the films 14, 16 and is thereby transferred to the films 14, 16. In case of a leaky test piece 12 the contour of the film surfaces of the films 14, 16 changes, since gas escapes from the leaking test piece 12 and its contour is changed thereby. The change of the contour of the films 14, 16 changes the shape of the grid 28 projected on the films 14, 16. This change of the shape of the grid 28 can be detected in the images 30, 32 captured by the imaging system 26.

The images 30 captured are compared to previously captured reference images 32 for the case of a tight test piece 12 or the case of a plurality of tight test pieces 12. It is decisive that the reference images 32 were captured for the same number and arrangement of the test pieces 12 as in the case of the leakage measurement. By a comparison of the shape of the grid 28 in the captured images 28 and the shape of the grids 28 in the reference images 32, a variance comparison can be performed and, e.g. when a predetermined deviation from the contours in the reference images 32 is exceeded, the presence of a leak can be concluded therefrom.

For this purpose, the imaging system 26 is provided with an image processing and image recognition software. The captured images are evaluated based on known image recognition algorithms. In particular, it is possible to thereby determine which of a plurality of test pieces 12 contained in the film chamber is leaky.

Figure 2:
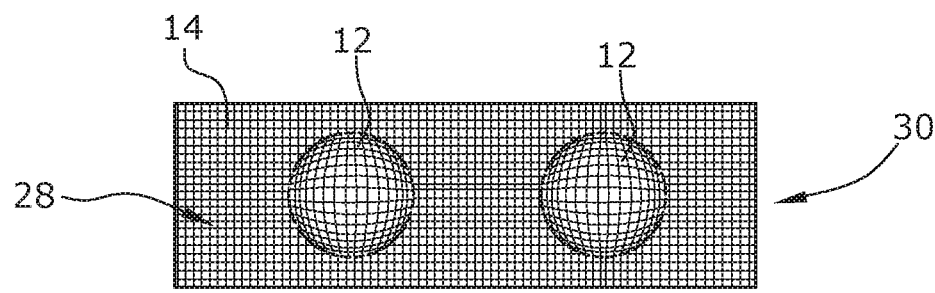
FIG. 2 shows the contour of the film surface in the case of a leaking test piece.

FIG. 2 shows the image 30 of the grid 28 in the case of one leaky test piece 12 of a plurality of test pieces 12.

Figure 3:
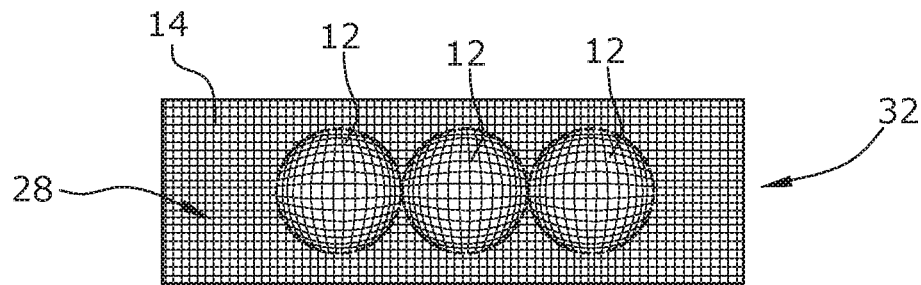
FIG. 3 shows the contour of the film surface of a tight test piece (reference image).

FIG. 3 shows the previously captured reference picture 32 of the grid 28 for the same number and arrangement of the test pieces 12 as in FIG. 2 in the case of tight test pieces 12. The situation illustrated in FIG. 3 serves as a reference for tight test pieces 12, i.e. for capturing a reference image 32 for a later comparison with the images 30 captured during leak detection. By comparing the contours and grids 28 in FIGS. 2 and 3, it is readily detectable which of the test pieces 12 is leaky, namely the central test piece 12.

The invention claimed is:

1. A method for leak detection on at least one flexible test piece in a film chamber, the method comprising:
    introducing the at least one flexible test piece into a film chamber;
    lowering a pressure in the film chamber outside the at least one flexible test piece;
    detecting a leak in the at least one flexible test piece by monitoring a spatial change of a film of the film chamber;
    transferring an outer contour of the at least one flexible test piece to at least one portion of the film by the lowering of the pressure in the film chamber,
    capturing said outer contour of the film by means of an image capturing device; and
    comparing the captured images of the outer contour of the film as produced by the at least one flexible test piece to reference images of the outer contour of the film as produced by tight test pieces,
    wherein a portion of the film captured by the image capturing device is provided with a grid, the position of which is monitored and evaluated.

2. The method of claim 1, wherein the grid is formed of intersecting lines or dots on a surface of the film.

3. The method of claim 1, wherein the grid is projected on a surface of the film.

4. The method of claim 1, wherein the grid is fixedly applied onto a surface of the film.

5. The method of claim 1, wherein a temporal course of a change of the outer contour of the film is evaluated as a measure of a leakage rate.

6. The method of claim 1, wherein a plurality of flexible test pieces is contained in the film chamber at a same time.

* * * * *